Nov. 22, 1966    H. B. LEE    3,286,619
DOUBLE CHAIN HYDROSTATIC COOKER
Filed June 26, 1963
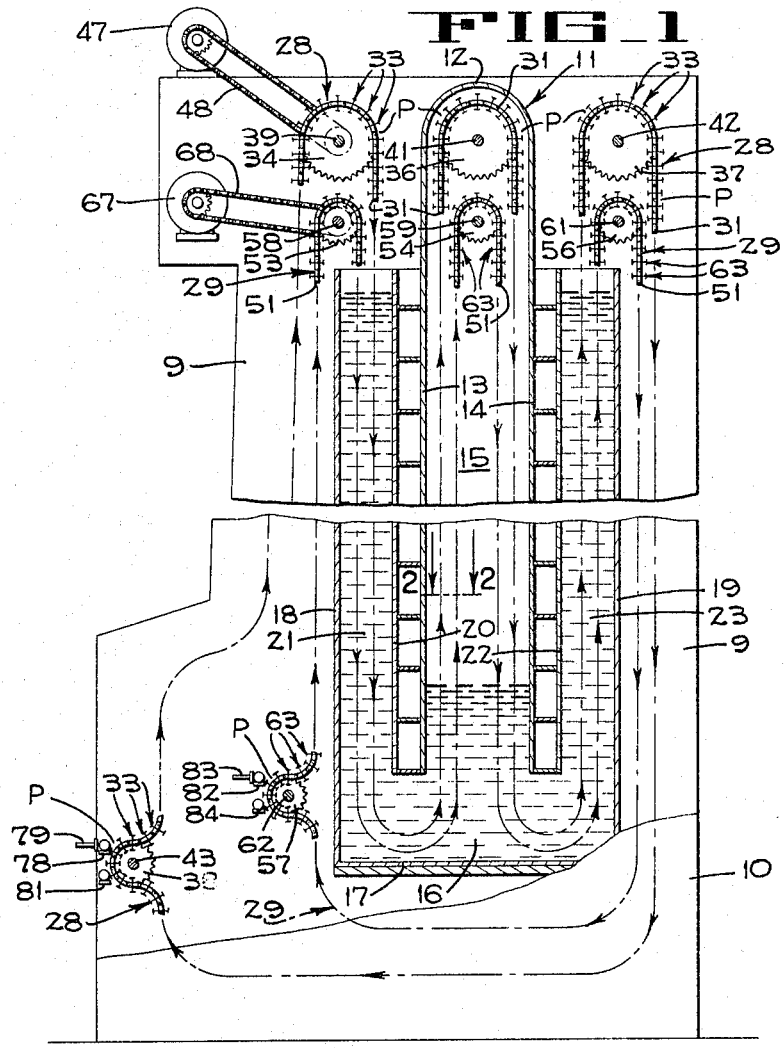
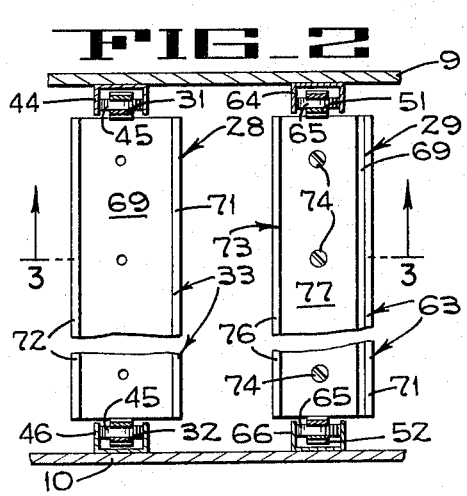
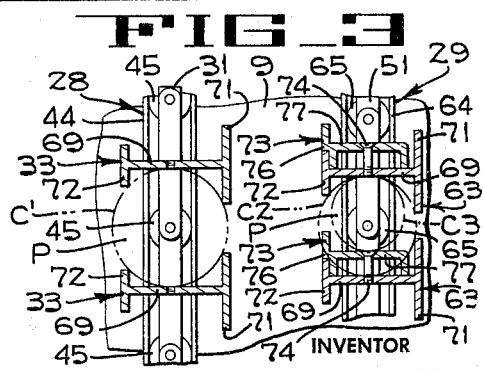
INVENTOR
HAROLD B. LEE
BY Hans G. Hoffmeister
ATTORNEY

United States Patent Office 3,286,619
Patented Nov. 22, 1966

3,286,619
DOUBLE CHAIN HYDROSTATIC COOKER
Harold B. Lee, West Heidelberg, Victoria, Australia, assignor to FMC Corporation, San Jose, Calif., a corporation of Delaware
Filed June 26, 1963, Ser. No. 290,756
6 Claims. (Cl. 99—362)

The present invention pertains to hydrostatic cookers and more particularly relates to an improved conveyor system for a hydrostatic cooker or sterilizer.

Hydrostatic cookers are generally between fifty and sixty feet tall so as to support water columns which are approximately forty feet tall. Also the widths of the cookers are usually sufficient to accommodate an endless conveyor having carriers thereon which are approximately eight feet long. These carriers are normally of the type which will retain rows of containers therein without the aid of guide rails or other retaining means, and which are adapted to handle a relatively small range of container sizes.

Because of the large dimensions of the cooker and because of the limited flexibility of the carriers for handling containers of different sizes, hydrostatic cookers are relatively expensive and are not as flexible as is desired by the industry. Also, the very large size of the several chambers of the hydrostatic cookers makes it necessary to provide large amounts of heating and cooling mediums therein, which mediums are usually water and steam.

Accordingly, it is one object of the present invention to provide a hydrostatic cooker arranged to simultaneously process containers of two different sizes, with either the same type of product or different types of products hermetically sealed therein.

Another object is to provide a hydrostatic cooker having two independently driven conveyors which are adapted to simultaneously carry containers at different speeds through several processing chambers of the hydrostatic cooker.

Another object is to provide a hydrostatic cooker adapted to more efficiently use the heating mediums therein.

Another object is to provide a hydrostatic cooker arranged to simultaneously process in common cooking and cooling chambers products which require different cooking times.

These and other obejcts and advantages of the present invention will become apparent from the following description and the accompanying drawings, in which:

FIGURE 1 is a fragmentary diagrammatic vertical central section of the double chain hydrostatic cooker of the present invention, certain parts being broken away.

FIGURE 2 is an enlarged horizontal section taken along lines 2—2 of FIGURE 1 showing two of the carriers, the central portion of the carriers being broken away.

FIGURE 3 is a vertical section taken along lines 3—3 of FIGURE 2.

The double chain hydrostatic cooker (FIG. 1) of the present invention comprises a pair of spaced vertical support walls 9 and 10 suitably supported in upright position. A housing 11, which extends between the walls 9 and 10, has a rounded upper end 12 and two depending walls 13 and 14 which cooperate with the walls 9 and 10 to define a cooking chamber 15 which is filled with steam at a predetermined cooking pressure and temperature, for example, at 250° F. and 15 p.s.i. approximate gauge. The lower end of the housing 11 opens into a water-filled trough 16 which is formed by the walls 9 and 10, a transverse horizontal plate 17 and the lower end portions of two transverse vertical walls 18 and 19. The wall 18 cooperates with another transverse vertical wall 20 to define an inlet hydrostatic water leg 21, and wall 19 cooperates with a transverse vertical wall 22 to provide an outlet hydrostatic water leg 23. The hydrostatic legs 21 and 23 communicate with trough 16 and are filled with water so as to create sufficient pressure to resist the pressure of steam in the cooking chamber 15. The inlet hydrostatic water leg 21 is thermostatically controlled to provide a gradually increasing water temperature from approximately 210° F. at its upper end to approximately 245° F. at its lower end. The outlet water leg 23 is also thermostatically controlled to provide a gradual decrease of water temperature from approximately 245° F. at its lower end to any suitable temperature below the boiling point of water at atmospheric pressure, depending upon the type of containers being handled, at the upper end thereof. Steam is added to the water in the hydrostatic inlet leg 21 to provide the desired heating temperatures therein, and cold water is directed into the outlet or cooling leg 23 to provide the desired cooling temperatures therein.

Rows of containers to be processed are carried through the cooker by two separate endless conveyors 28 and 29 (FIGS. 1, 2 and 3). The outer conveyor 28 comprises a pair of endless chains 31 and 32 (FIG. 2) having a plurality of elongated spaced carrier bars 33 mounted therebetween. The chains 31 and 32 are trained around transversely aligned pairs of sprockets 34, 36, 37 and 38 (FIG. 1) which are keyed to shafts 39, 41, 42 and 43 respectively that are suitably journaled on the side walls 9 and 10. The chains 31 and 32 are guided along tortuous paths by channel tracks 44 and 46 (FIG. 2), respectively, which are secured to the frame of the cooker and are arranged to receive rollers 45 carried by the chains. A variable-speed motor 47 is connected to the shaft 39 by a chain drive 48 and drives the conveyor 28 in the direction of the arrows indicated on the pitch line showing in FIG. 1 of the path of travel of the conveyor.

The inner conveyor 29 likewise comprises a pair of endless chains 51 and 52 which are trained around pairs of transversely aligned sprockets 53, 54, 56 and 57 that are keyed to shafts 58, 59, 61 and 62, respectively, which shafts are journalled in the side walls 9 and 10. A plurality of elongate carriers 63 (FIG. 2) are disposed between and are evenly spaced along the chains 51 and 52 and serve to support rows of containers therebetween. Guide channels 64 and 66 are provided to guide rollers 65 of the chains 51 and 52, respectively, along tortuous paths in the direction of the arrows illustrated in FIGURE 1. The conveyor 29 is driven by a variable-speed motor 67 which is mounted on the wall 9 and is connected to the shaft 58 by a chain drive 68.

The carriers 33 and 63 of the conveyors 28 and 29, respectively, are identical except for size and each carrier includes a container-supporting body 69 (FIG. 3) rigidly secured between links of the associated chains substantially intermediate the lengths of the links. Each body 69 has a wide flange 71 integrally formed on one end thereof and a narrow flange 72 integrally formed on the other end thereof. The space between the bodies and flanges of adjacent carriers defines a carrier pocket P within which the rows of containers are retained as the conveyors move through the cooker.

In order to handle rows of containers of different diameters, the chains 31 and 32 of the outer conveyor 28 (FIG. 3) have a larger pitch than the chains 51 and 52 of the inner conveyor 29, and the outer carriers 33 are larger than the inner carriers 63. If it is desired to handle smaller containers than would normally be handled by the carriers on either the conveyor 28 or 29, each carrier which is to handle the smaller containers is provided with an adapter 73 which is connected to its associated carrier by a plurality of screws 74. Each adapter includes a flange 76 and a body portion 77 which in effect merely reduces the size of the carrier pockets P. As is clearly shown in FIG. 3, the addition of the adapter flange 76 to the carriers 63 reduces the space between the narrow flanges 72 through which small containers are apt to be inadvertently discharged as they are moved along their tortuous paths through the cooker.

As is well known in the art, containers are fed into and discharged from the pockets P as the carriers are moved around a sharp curve. Accordingly, as the carriers 33 of the outer conveyor 28 move around the sharp bend defined by the sprockets 38, rows of containers to be processed are pushed from a feed conveyor 78 into the open pockets P by any suitable type of feed mechanism 79. The feed mechanism 79 may be of the type which includes a horizontally reciprocated pusher which is actuated by the rollers 45 as they move past predetermined points adjacent the sprockets 38. After the rows of containers have travelled through the entire cooker, the rows of containers fall by gravity from the open pockets P onto a discharge conveyor 81. Similarly, as the carriers 63 of the inner conveyor 29 move around the sharp bend defined by the sprockets 57, rows of containers to be processed are pushed from a feed conveyor 82 into the open pockets P by a feed mechanism 83 which is similar to the mechanism 79. After these rows of containers have been processed, they fall by gravity from the open pockets P onto a discharge conveyor 84.

In the operation of the double chain hydrostatic cooker of the present invention, steam and water are directed into the cooker and are raised to desired temperature before the processing of the containers is started. The variable-speed motors 47 and 67 are then independently set at speeds which will cause the containers to remain in the cooking chamber 15 for a sufficient inteval to assure sufficient cooking and sterilization of the product within the containers. It is well known that the larger containers require longer periods in the cooking chamber 15 than the smaller containers in order to attain the same sterilizing values.

Rows of large containers, such as containers C' (FIG. 3), and rows of small containers, such as containers C2 or C3, depending on whether the adapters 73 are used, are directed into feed position adjacent the conveyors 28 and 29 by the feed conveyors 78 and 82, respectively. These rows of containers are pushed into the carrier pockets P of the associated conveyors 28 and 29 by the feed mechanisms 79 and 83, respectively, which are operated in timed relation with the movement of the particular conveyor associated therewith. Each conveyor 28 and 29 then advances the associated rows of containers through the heating and cooling mediums in the hydrostatic cooker at speeds which will produce the best effect on the particular product being processed in the particular size of container being used. Usually larger sized containers require longer processing periods at a given temperature than smaller containers; therefore, the conveyor 28, which handles the larger sizes of containers, will normally be moved through the processing mediums at a speed which is slower than that of the conveyor 29 which handles the smaller containers.

Although the speeds of the two conveyors are not the same, it will be apparent that both conveyors move through the common cooking chamber 15 and through common hydrostatic legs 21 and 23. Accordingly, the heat transfer mediums within the cooker are more efficiently used than they would be in the case of a single chain hydrostatic cooker. It will also be appreciated that movement of the two conveyors at different speeds through a common heating medium, especially the water in the hydrostatic legs 21 and 23, will create cross currents in the heating mediums which will also improve heat transfer characteristics of the heating mediums.

It is apparent from the foregoing description that the pair of independently driven conveyors move rows of containers through common heating mediums in the hydrostatic cooker at different speeds. The conveyors may each handle different ranges of container sizes, and the containers may contain either the same or different products therein. The use of the two independent conveyors provides a cooker which more efficiently utilizes the heating medium and which is capable of a more flexible and efficient use by the industry.

While one embodiment of the present invention has been shown and described, it will be understood that various changes and modifications may be made without departing from the spirit of the invention or the scope of the appended claims.

The invention having thus been described, what is believed to be new and desired to be protected by Letters Patent is:

1. A hydrostatic sterilizer comprising means defining a sterilizing chamber having a sterilizing medium therein, means defining a vertically extending hydrostatic water leg having heated water therein communicating with said sterilizing chamber and arranged to balance the pressure of the sterilizing medium in said sterilizing chamber, a first and a second conveyor extending through said sterilizing chamber and said water leg, first drive means for driving said first conveyor at a predetermined speed, and second drive means for driving said second conveyor at a speed different from that of said first conveyor.

2. A hydrostatic sterilizer comprising means defining a sterilizing chamber having a sterilizing medium under pressure therein, means defining a vertically extending hydrostatic water leg having heated water therein communicating with said sterilizing chamber and arranged to balance the pressure of the sterilizing medium in said sterilizing chamber, a first and a second conveyor extending through said sterilizing chamber and said water leg, first drive means for driving said first conveyor at a predetermined speed, and second drive means for driving said second conveyor at a speed different than that of said first conveyor, the movement of said conveyors through said water leg being effective to generate cross currents in the heated water thereby improving the heat transfer characteristics of the water.

3. A hydrostatic sterilizer comprising means defining a sterilizing chamber having a sterilizing medium therein, means defining a vertically extending hydrostatic water leg communicating with said sterilizing chamber and arranged to balance the pressure of the sterilizing medium in said sterilizing chamber, a first conveyor extending through said sterilizing chamber and said water leg for carrying first containers therethrough, first variable speed drive means connected to said first conveyor for driving said first conveyor at a speed suitable for sterilizing the contents of said first containers, a second conveyor extending through said sterilizing chamber and said water leg for carrying second containers therethrough while said first containers are being moved therethrough, and second variable speed drive means connected to said conveyor for driving said second conveyor at a speed different from that of said first conveyor and at a speed suitable for sterilizing the contents of said second containers.

4. A hydrostatic sterilizer comprising means defining a sterilizing chamber having a sterilizing medium under pressure therein, means defining a vertically extending hydrostatic water leg communicating with said sterilizing chamber and arranged to balance the pressure of the sterilizing medium in said sterilizing chamber, a first conveyor extending through said sterilizing chamber and through said water leg, a plurality of first container carriers on said first conveyor arranged to receive and retain rows of containers of a predetermined size range therein, a second conveyor extending through said sterilizing chamber and said water leg, a plurality of second container carriers on said second conveyor arranged to receive and retain rows of containers therein, said second carriers being larger than said first carriers and being arranged to support container of a larger size range than suppoted by said first carriers, first variable speed drive means for driving said first conveyor at a predetermined speed, and second variable speed drive means for driving said second conveyor at a speed different from that of said first conveyor.

5. A hydrostatic sterilizer comprising means defining a sterilizing chamber having a sterilizing medium therein, means defining a vertically extending hydrostatic water leg communicating with said sterilizing chamber and arranged to balance the pressure of the sterilizing medium in said sterilizing chamber, a first conveyor extending through said sterilizing chamber and said water leg, a plurality of first container carriers on said first conveyor, each carrier having a pocket for receiving and retaining a row of containers of a predetermined size range therein, an adaptor on each of said first container carriers arranged to reduce the capacity of the pocket and adapt the pocket to handle containers of a size range which is smaller than that of said predetermined size range, a second conveyor extending through said sterilizing chamber and through said water leg, a plurality of second container carriers on said second conveyor arranged to receive and retain rows of containers therein, said second carriers being arranged to support containers of a larger size range than supported by said first carriers with said adapters thereon, first variable speed drive means for driving said first conveyor at a predetermined speed, and second variable speed drive means for driving said second conveyor at a speed different from that of said first conveyor.

6. A hydrostatic sterilizer comprising means defining a sterilizing chamber having a sterilizing medium therein, means defining a vertically extending hydrostatic water leg communicating with said sterilizing chamber and arranged to balance the pressure of the sterilizing medium in said sterilizing chamber, a first conveyor extending through said sterilizing chamber and said water leg, a plurality of first container carriers on said first conveyor arranged to receive and retain rows of containers of a predetermined size range therein, a second conveyor extending through said sterilizing chamber and through said water leg, a plurality of second container carriers on said second conveyor arranged to receive and retain rows of containers therein, said second carriers being larger than said first carriers and arranged to support containers of a larger size range than supported by said first carriers, first variable speed drive means for driving said first conveyor at a predetermined speed, and second variable speed drive means for driving said second conveyor at a speed different from that of said first conveyor, said speed difference between said first and second conveyors causing agitation and cross currents to be formed in the heating water in said water leg thereby improving the heat transfer characteristics between said water and the containers.

References Cited by the Examiner

UNITED STATES PATENTS 2,806,423  9/1957  VanDerWinden _____ 99—362
2,818,012  12/1957  Webster _____ 99—362
2,893,536  7/1959  Jones _____ 198—31

LOUIS O. MAASSEL, *Primary Examiner.*